United States Patent Office 3,654,148
Patented Apr. 4, 1972

3,654,148
LIQUID PURIFICATION SYSTEM
William E. Bradley, New Hope, Pa., assignor to
Puredesal, Inc., Levittown, Pa.
Filed Sept. 28, 1970, Ser. No. 75,940
Int. Cl. B01d 13/00, 31/00
U.S. Cl. 210—23                                11 Claims

ABSTRACT OF THE DISCLOSURE

Liquid purification is accomplished using the same pressure dialysis or reverse osmosis membrane in desalination or fluid processing apparatus to achieve two or more successive stages of purification. By operating the apparatus using a particular time sequence of fluid pressures and/or solutions having different concentrations and chemical compositions, the apparatus and particularly the reverse osmosis membrane are effectively rejuvenated for substantially continuous utilization.

BACKGROUND OF THE INVENTION

The present invention relates to a liquid purification system and more particularly, to a liquid purification system in which the same reverse osmosis membrane is employed to achieve at least two stages of successive liquid purification. The system finds especial application to sea water desalinization.

Water is one of the most important substances with which man deals. The quantities of water required for different uses vary over a wide range. For example, the amount of drinking water needed each year by human beings and domestic animals is of the order of 10 tons per ton of living tissue. Industrial water requirements for washing, cooling, circulation of materials, etc., range from one to two tons per ton of product in the manufacture of brick up to 250 tons per ton of paper and 600 tons per ton of nitrate fertilizer. Even the largest of these quantities is small compared with the amounts of water needed in agriculture. To grow a ton of sugar or corn under irrigation about 1,000 tons of water must be "consumed," that is, changed by soil evaporation and plant transpiration from liquid to vapor. Wheat, rice and cotton fiber respectively require about 1,500, 4,000 and 10,000 tons of water per ton of crop.

The ever-increasing utilization of water coupled with the depletion of natural sources of potable water due to its utilization and pollution caused by man has made it imperative that economically practical liquid purification methods be discovered. One of the most promising methods which has been studied is the reverse osmosis system. Osmosis may be defined as the transport of a fluid across a boundary which separates two solutions of differing solvent activity. The direction of solvent flow under an osmotic gradient is always from the more dilute into the more concentrated solution. Reverse osmosis may be defined as the flow of solvent across the boundary from the more concentrated to the less concentrated solution as a result of application of pressure in excess of the osmotic pressure difference between the two solutions. The rate at which reverse osmosis occurs is directly related to the membrane constant, the area of the membrane, and the pressure employed and inversely related to the thickness of the membrane.

Reverse osmosis is of particular interest as a water purification process because of the potentially low energy consumption compared to distillation processes and freezing processes which have been suggested for such purification. This advantage derives from the ambient-temperature operation of the process and particularly from the fact that no change of state or phase change is involved. Thus, a reverse osmosis process need not deal with latent heats, which are enormous compared to the separation energy of water from saline solutions.

In addition, reverse osmosis processes are relatively simple to operate and have inherent flexibility in both use and plant expansion capabilities.

Fresh water is commonly defined as water containing less than about 1,000 parts per million of dissolved salts. According to United States Public Health Service standards, drinking water should preferably contain less than 500 parts per million of dissolved salts. The salinity of waters available for conversion to fresh water varies greatly—ranging from oceans which are fairly uniform, averaging about 35,000 parts per million of dissolved salts, to brackish water which is less salty than the ocean, but contains more than 1,000 parts per million of dissolved salts.

Common salt, sodium chloride, accounts for most of the saltiness of sea water. However, sea water contains small amounts of many other salts, including: approximately 3,807 parts per million of magnesium chloride; approximately 1,658 parts per million of magnesium sulfate; approximately 1,260 parts per million of calcium sulfate; approximately 863 parts per million of potassium sulfate; approximately 123 parts per million of calcium carbonate; and approximately 76 parts per million of magnesium bromide.

Membranes made of cellulose acetate have been used to remove 90 to 95% of the salt found in oceans in one pass. Unfortunately, cellulose acetate lacks high stability and long life. Accordingly, other membranes are being used in reverse osmosis processes. One of the most promising of such membranes is nylon, in the form of hollow fibers. A shell and tube configuration called a permeator, which is similar to a single end heat exchanger, is used for housing the hollow fibers employed as membranes. At one end, the fibers are normally potted or encapsulated in epoxy resin which serves as a pressure seal. The permeators typically have three pipe connections: (a) an input connection or feed connection through which untreated liquid enters at high pressure; (b) a reject output through which liquid having higher salt concentration than the liquid entering through the input or feed connection emerges from the permeator at high pressure; and (c) a permeate output connection from which purified and/or desalinated liquid emerges at a low positive pressure.

Inside the permeator, the flow of liquid through the shell may be counter-current with the flow of the permeate inside the hollow fibers. In conventional operation, a high pressure pump is used to introduce the solution to be processed into the shell of the permeator. Product liquid, e.g., water, permeates through the walls of the hollow fibers inside the permeator and travels along the interior of the fibers through a bulkhead into the permeate output section. The portion of the feed solution which fails to permeate through the hollow fiber walls, i.e., reject liquid, is continuously discharged from the other end of the permeator and emerges at substantially the inlet pressure, which may be of the order of 600 to 1000 pounds per square inch.

Problems which have limited the effectiveness of permeators for the purification of liquids include (1) supersaturation, (2) scale deposition, and (3) corrosion inside both the permeator and output pump. A reverse osmosis liquid treatment system for overcoming these problems is disclosed in an application by Bradley, Ser. No. 27,049, filed Apr. 9, 1970, and entitled "Liquid Treatment System," in which the combination of a permeator which separates relatively pure liquid from untreated liquid input material, an input pump which supplies untreated liquid input material to the permeator under pressure and a positive displacement output pump for pumping reject liquid material under pressure from the permeator at a predetermined rate, and means for operating the input and output pumps are disclosed. The positive displacement output pump is self-cleaning and capable of operating as a motor. In one preferred embodiment, disclosed in the aforementioned pending application, positive displacement pumps, such as positive displacement screw conveyor type pumps, are employed for both the input and output pumps. Regardless of the type of pumps employed, the input and output pumps are preferably connected by means of a pulley, gears or other suitable means to an electric motor which is operated at a fixed or variable speed in order to maintain the pressure required for the reverse osmosis liquid treatment system while maintaining a predetermined ratio between the input pump speed and the output pump speed. Alternatively, both pumps can be driven by separate electric motors such as synchronous motors or induction motors whereby a predetermined ratio of flow between the two pumps is maintained. Each pump is then belt or gear-connected to its proper motor so that the speed ratio can be made equal to a desired value. In this alternative arrangement, the decompressor or output pump operates as a hydraulic motor, and the electric "motor" operates as a generator, returning the energy of the reject stream decompression to the electric power supply, thereby reducing the net power consumption of the system.

The present invention finds particular application in overcoming a problem characteristic of desalinization operations. Prior to entry into desalinization apparatus it is difficult to remove all marine organisms from sea water so that marine growths tend to accumulate in the desalinization apparatus customarily used. The high level of salinity of sea water, in combination with biological material of large molecular weight, also tends to produce membrane clogging. As purified product water is removed from the feed stream adjacent to the membrane surface a layer of slime composed mainly of material of biological origin accumulates thereon. As a result, a boundary layer is built up at the membrane surface which obstructs fluid flow and interferes with salt out-diffusion away from the membrane. Thus, immediately adjacent to the membrane the feed stream may be considerably more concentrated than would be calculated or measured at any other given point along the input stream. The effect of this boundary layer is to increase salt permeation and reduce permeate flow below that expected where no boundary layer exists.

These problems characteristic to desalinization operations are not overcome by the conventional reverse osmosis systems employing cascade operation, or a series of multiple permeators, to obtain desalinization. Attempts at introducing the feed stream with sufficient velocity to cause turbulence in the permeator and thereby reduce the thickness of the laminar boundary layer adjacent to the membrane have not been successful. Such a procedure requires a delicate balance to hold the pressure drop sufficiently low to be consistent with maintaining the stability of the membrane and obtaining a low energy loss while maintaining sufficient velocity to hold the boundary layer within a fixed acceptable performance limit. Moreover, marine organisms from sea water continue to grow substantially uninhibited by such turbulence in desalinization or fluid processing apparatus.

SUMMARY OF THE INVENTION

An object of the present invention is to provide a reverse osmosis liquid treatment and purification system which is capable of operating without manual adjustment for extended periods of time and which is economically practical.

Another object of the invention is to obtain substantial economy in the use of a reverse osmosis desalination or fluid processing permeator by reprocessing permeate through the same permeator two or more times.

Another object of the invention is to provide a system for exposing a reverse osmosis membrane to a time sequence of pressure variations to effect a backwash of the membrane by the action of osmotic pressure during a portion of the said time sequence.

It is a further object of the invention to provide a system for exposing a reverse osmosis membrane to a time sequence of solutions having markedly different concentrations or chemical compositions in order to clean or otherwise favorably affect the membrane.

It is another object of the invention to provide unfavorable growing conditions for aquatic organisms within reverse osmosis apparatus by exposing such organisms to frequent changes in salt concentrations or chemical compositions.

Another object of the invention is to provide for the time sequential alteration of the fraction of input fluid rejected in accordance with the salt concentration or chemical composition of the fluid being processed and to perform this alteration with high energy utilization efficiency.

A further object of the invention is to provide flexibility with respect to the amount of product produced by each stage by controlling the time durations in a sequence of reverse osmosis desalination or fluid processing operations.

Still another object of the invention is to provide a system for the production of several chemical types of permeate from a single permeator.

Other objects of the invention will be recognized by those skilled in the art and the examples and illustrations in this application are representative only and are not to be interpreted in a limiting sense. With these and other objects in mind, the reverse osmosis liquid purification system of the present invention embodies input "compressor" pumps capable of supplying untreated fluids under pressure; a permeator for separating relatively pure fluid or permeate, such as water, from the untreated fluid input mateial; a storage system for retaining the relatively pure fluid separated by the permeator; output "decompressor" pumps for pumping the reject fluid from the permeator; and means for recirculating the relatively pure permeate or fluid through the permeator for a desired number of successive stages. In place of decompressor pumps, decompression valves could be used at some energy cost and with decreased reliability without departing from the basic concept of the invention.

Positive displacement pumps, which are self-cleaning and which are capable of operating as a motor, are preferably employed as the decompressor pumps. Screw conveyor pumps known as "Moyno" pumps are suitable. Each pair of input and output pumps are preferably connected by means of a pulley, gears or other suitable means to an electric motor which is operated at a fixed or variable speed in order to maintain the required pressure for the reverse osmosis liquid purification system, while maintaining a predetermined ratio between the input pump speed and the output pump speed. Alternatively, the input and output pumps may be driven by separate electric motors, such as synchronous motors or induction motors, whereby a predetermined ratio of flow between the input and output pumps is maintained. Each pump may be belt or gear-connected to its proper motor so that the speed ratio can be made equal to a desired value. In this arrangement, the decompressor pumps operate as hydraulic motors, returning the energy of the reject stream decompression to the electric power supply, thereby reducing the net power consumption of the system.

Advantageously, somewhat different ratios of reject flow to input flow are used for the successive stages of operation. Specifically, during the initial phase of operation the reject ratio is very high (above 50 percent and preferably greater than 80) in order to keep as low as possible the concentration of fluid exposed to the high pressure face of the membrane inside the permeator. During subsequent passes through the permeator, the permeate collected from early operations is transmitted at a reject ratio substantially less (i.e. 50 percent or less). The identical procedure is repeated until permeate liquid of the desired purification is obtained. The permeator is then flooded with concentrated fluid at low pressure to effect membrane "backwash" by osmotic pressure, after which the sequence of events is repeated as before to produce any desired amount of permeate liquid.

BRIEF DESCRIPTION OF THE DRAWINGS

Other and further objectives, advantages, and features of the invention will be apparent to those skilled in the art from the following detailed description thereof, taken in conjunction with the accompanying drawings, in which.

DESCRIPTION OF THE PREFERRED EMBODIMENTS

Figure 1:
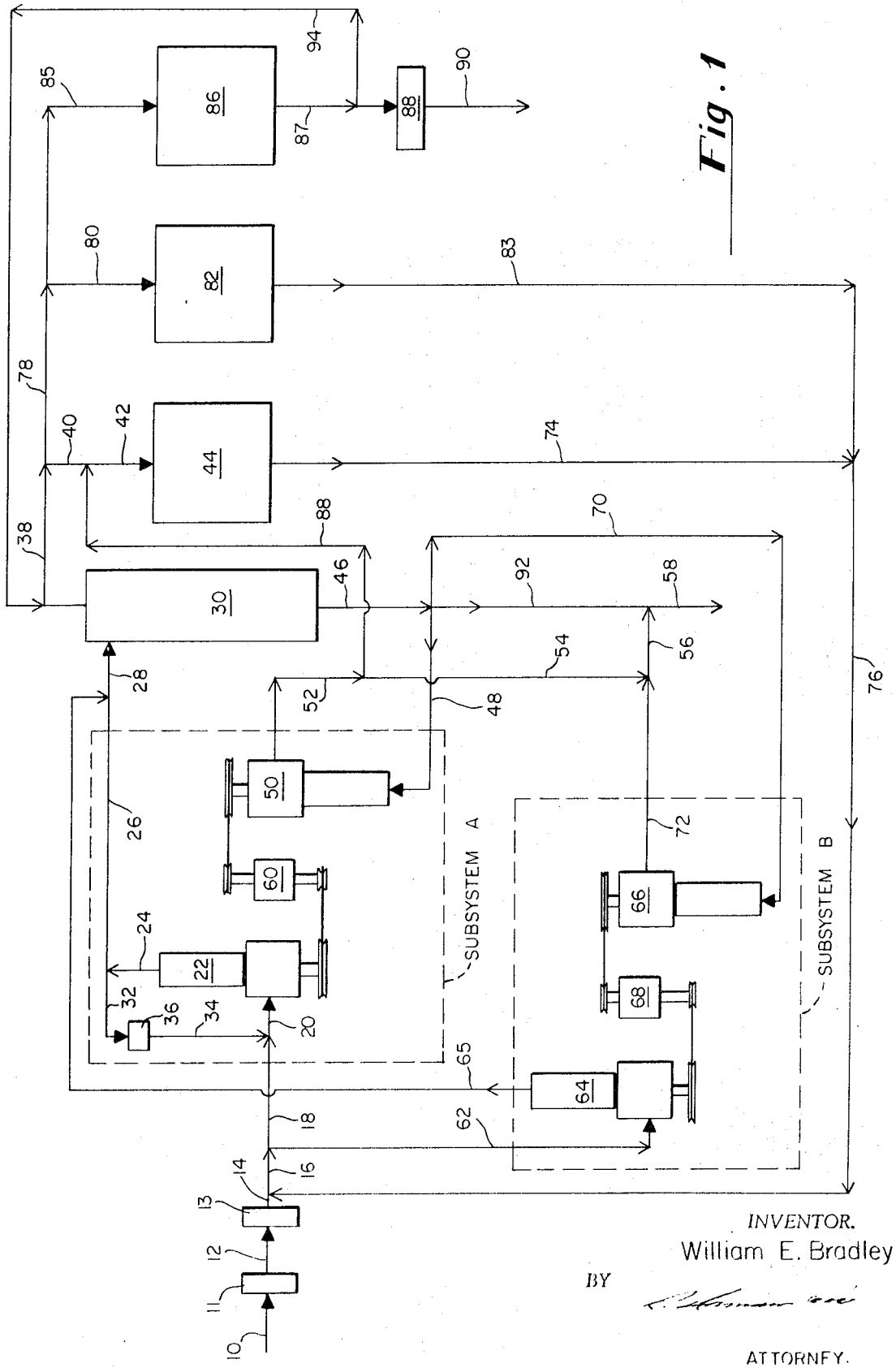
FIG. 1 is a diagrammatic illustration of one embodiment of the present invention.

Referring to FIG. 1, untreated liquid is fed through conduit 10 to a first pretreatment element such as filter 11, where the input feed stream is filtered to remove undissolved solids of a particular size, such as undissolved solids having a diameter greater than 10 microns. The liquid is then passed through conduit 12 to a second pretreatment element 13, for carbon filtration, for addition of chemicals to inhibit precipitation of calcium or other polyvalent cations or for adjusting the pH of the input feed stream. The liquid is then passed through conduits 14, 16, 18 and 20 into pump 22 which causes the liquid to be pumped through conduits 24, 26 and 28 to the upstream face of the reverse osmosis membrane in permeator 30. Conduits 32 and 34 and valve 36, such as a spring biased pressure relief valve, can be employed to regulate the pressure in conduit 26. Purified liquid, such as water, emerges at low positive pressure from the permeate output connection and passes through conduits 38, 40 and 42 into storage tank 44. The reject output from the upstream face of the membrane in permeator 30 is discharged through conduits 46 and 48 into output or decompressor pump 50 and then into conduits 52, 54, 56 and 58 for discharge.

Advantageously, both input or high pressure pump 22 and output or decompressor pump 50 are connected to the same motor 60, through suitable means such as a gear or belt drive. Motor 60 can be regulated by pressure operated speed control means (not shown) which is dependent upon the pressure in conduits 26 and/or 28.

During some stages of the sequence, untreated liquid is also passed through conduit 62 to compressor or high pressure pump 64 which delivers the liquid under high pressure through conduit 65 to conduit 26. Decompression pump 66 is substantially identical to pump 50 and operates as a motor aiding motor 68. Pump 66 is operated at such a speed that the flow of reject material from conduit 70 through the pump and into conduit 72 is approximately 95% of the flow through compressor pump 64. Compressor pump 64 and decompression pump 66 act as a pressure exchange mechanism and increase greatly the flow of fluid exposed to the upstream face of the membrane in permeator 30 during the first and fourth stages of the operating sequence which will be described hereinafter. Thus, while pumps 22 and 50 can be operated during each stage, pumps 64 and 66 are rendered inoperative during some stages by disconnecting the pumps from all electric power.

The input or "compressor" pumps, which may be high pressure reciprocating pumps, gear pumps, centrifugal feed pumps or self-priming, positive displacement pumps, can be operated at fixed or variable speed. The preferred output pumps, however, are self-priming, positive displacement pumps, which operate like a precision screw conveyor with a rotor turning inside a stator. A compression fit exists between the rotor and the stator so as the rotor turns within the stator cavities are formed which progress toward the discharge end of the pump. The advantages of such output pumps include the fact that the pumps are capable of handling all fluids with a minimum of turbulence, agitation and pulsation; they will pump liquids containing a high percentage of solids; they are essentially self-cleaning; and they can readily be made corrosion-resistant. Thus, the aforementioned output pumps can advantageously be employed in the liquid treatment system of the present invention for handling reject streams having a high level of salinity and biological material.

Since the helical rotor of a positive displacement pump continuously flexes and wipes the stator during its operation, no scale accumulation is permitted to occur on the working parts. As a positive displacement pump, the flow rate of the pump varies directly with rotational speed, and hence the reject flow may be made a predetermined fraction of the input flow to the permeator by using appropriate feedback connections providing a fixed speed ratio between the input pump and the reject control pump. Thus, the reject control pump actually runs as a hydraulic motor, helping to turn the input pump, and this hydraulic motor action of the reject control or "decompressor" pump permits the input "compressor" pump to operate with somewhat less driving power required. In large installations, the resulting economy of electrical power is important, especially at low conversion ratios. Thus, the reject ratio determines conversion ratio and can be adjusted by changing the feedback arrangement, e.g., pulley diameters, gear sizes, etc.

During the initial operation, the input or "compressor" pumps are preferably operated to obtain a pressure of the order of 600 to 1500 pounds per square inch. During this initial phase of operation, the reject ratio is maintained very high in order to keep as low as possible the concentration of the liquid (e.g., salinity of water) exposed to the high pressure phase of the membrane in permeator 30. One suitable reject ratio would be 8/10 of the input flow.

The permeate which flows into storage tank 44 has a concentration greatly different from the input stream in conduit 10. In case of sea water, the permeate stored in tank 44 is significantly reduced in salinity. Nevertheless, the net energy required for this initial portion of the process is not excessive since the energy from the reject stream is recovered by the reject or output pumps which operate as hydraulic motors to assist in driving the input or "compressor" pumps. Accordingly, the large reject ratio does not cause a substantial loss of net energy.

There are 4 stages in a typical sequence of operation. During the first stage subsystems A and B are supplied with raw input fluid and deliver permeate to tank 44 Subsystem B operates to increase the flow through permeator 30 in order to maintain a suitably low salt concentration on the upstream face of the membrane of the permeator.

During the second stage, the external power supply for subsystem B is turned off so that motor 68 stops and flow through subsystem B approaches zero. The raw input supply is also closed off and the fluid stored in tank 44 is drawn through conduits 74 and 76 for reprocessing in permeator 30. During this second stage the permeate is delivered via conduits 38, 78 and 80 to tank 82 for storage. The rejected fluid from permeator 30 passes through the decompressor pump 50 to the drain. When all of the fluid in tank 44 has been processed, the second stage is terminated.

For certain purposes, the two stages described above are sufficient to produce usable liquid. In other instances, depending in part on the membrane employed and the ultimate use made of the permeate liquid, it may be necessary to continue the process one or more additional stages. For a third stage, the permeate liquid in storage tank 82 is passed through conduit 83 and recirculated through permeator 30. Permeate material obtained from this operation, after passing through conduits 38, 78 and 85, is then stored in storage tank or cistern 86. For this third stage, the reject liquid, which has a substantially higher purity than the untreated liquid initially introduced through conduit 10, is passed through conduit 88 and stored in the first storage tank 44, thereby improving the economy of operation and offering liquid having various degrees of purification for utilization or reprocessing. The choice of liquid available is important since the purification of sea water, for example, is not as critical for use in agricultural or industrial cooling purposes as the purification required for drinking purposes.

Obviously, the number of stages can be increased within reason for higher degrees of purification. However, for most purification requirements, three stages are sufficient and the purified liquid in storage tank or cistern 86 is withdrawn for ultimate use by passing the liquid through conduit 87 through any desired post treatment element 88, such as a chlorinator, before passing through output conduit 90.

During the first, second and third stages, the internal environment of subsystem A is subjected to a considerable range of salinity or fluid composition because of the action of the membrane upon the fluid during the successive reprocessing stages. This fluctuation from stage to stage in salinity or composition tends to discourage the growth of marine organisms since it causes a degree of osmotic shock to the living cells of such organisms. This action is carried to an extreme during the fourth stage of the sequence. During this fourth stage the reject terminal of the permeator 30 is vented directly through conduits 46, 92 and 58 to the drain so that the pressure on both sides of the membrane in permeator 30 remains very low. The motors of both subsystems A and B are then operated as with raw fluid input supply. If this raw fluid is of high salinity, as is the case with seawater for example, then the interior of the permeator 30 is rapidly filled with seawater at low pressure. During this fourth stage, the permeate terminal of permeator 30 is connected to the fresh fluid cistern output terminal via conduit 94 and, due to the action of ordinary osmosis, fresh fluid is drawn from the tank 86 backwards into the permeator through the membrane in a direction contrary to that existing during the first, second and third stages. This tends to lift from the surface of the membrane any layer of accumulated mineral or organic slime, the effect being an osmotic backwash of the membrane. The rapid flow of fluid (or seawater) through the permeator during this stage washes out the material loosened by osmotic backwash.

The sudden change of salinity between stages three and four delivers an intense osmotic shock to any living organisms in the apparatus of subsystems A and B, thereby killing or at least inhibiting growth of such organisms. The duration of the fourth stage is preferably made much shorter than that of other stages in order to avoid waste of the accumulated product in tank 86. Short duration of the fourth stage is permissible because most of the benefits of this stage are achieved very quickly, i.e., within a few minutes. While it is true that some marine organisms can survive a slow change from salt to fresh or brackish water, most cannot stand frequent successive transitions from water having a high salt concentration to fresh or brackish water and then to water again having a high salt concentration.

In place of or in addition to changes in fluid concentration, changes in fluid pressure causes the reverse osmosis membrane to be rejuvenated. One desirable time sequence of pressure changes involves operation at high pressure for five minutes and at low pressure for one half minute and then repeating this sequence.

Following this low pressure "backwash" the system is again operated according to the cycle described above.

Figure 2:
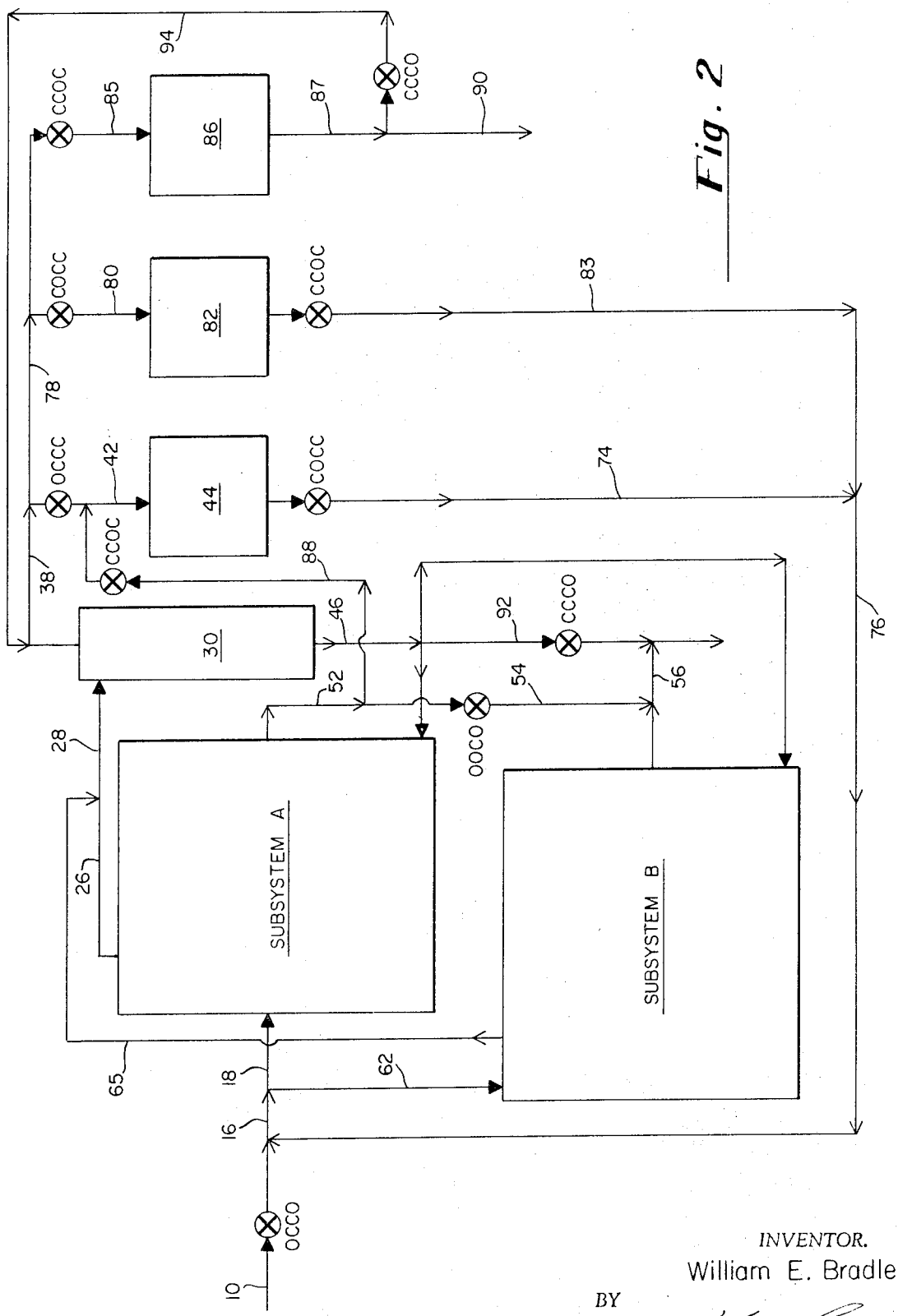
FIG. 2 is a diagrammatic valve sequence diagram for the embodiment shown in FIG. 1.

The valve sequence for the foregoing stages is described in FIG. 2. In this diagram, subsystems A and B are indicated by blocks A and B. The valves are diagrammed as simple, manually operated gate valves, but it should be understod that collectively actuated groups of valves or complex spool valves could be used to simplify actual operation. The exact embodiment of valve structure is unimportant, ony the sequence of valve operations from stage to stage is critical. Adjacent to each valve in FIG. 2 is a sequence of four letters—"O" standing for "valve open," i.e., allowing fluid to pass through; "C" standing for "valve closed." The first letter of the four letter sequence indicates the condition of that valve during the first stage of operation of the system. The second letter indicates the valve condition during the second stage, and so on for all four stages. Thus for example, the sequence of letters "OCCO" means that a valve is open during stage one, closed during stages two and three, and opend uring stage four. For simpliicty various elements such as filters, treatment areas and conduits have not been shown in FIG. 2. It will be understod that additional valves can be used, particularly if it is desired to control subsystem B by means other than the power supplied to motor 68.

Obviously, the size of the permeator can be varied— the limiting factor being the thickness of the tube sheet and the resulting greater pressure drop as the product fluid flows through the portion of the fibers embedded in the tube sheet. A typical 12" diameter by 7' permeator shell contains 15 to 30 million hollow fibers with surface areas of 50,000 to 80,000 square feet.

As more fully described in copending application Ser. No. 27,049 filed Apr. 9, 1970, electrical power feedback can be employed to eliminate mechanical power linkages between the input and output pumps and the electric motor used to drive these pumps. In a method of positive displacement flow control which can be considered as "electrical gearing," both the input and output pumps may be driven by separate electric motors such as synchronous motors or induction motors. Each pump may be belt or gear connected to its proper motor so that the speed ratio can be made equal to any desired value. In this arrangement, the output or "decompressor" pump operates as a hydraulic motor, returning the energy of the reject stream decompression to the electric power supply, thereby reducing the net power consumption of the system. Such an arrangement not only results in power economy, but it is a convenient physical arrangement in that it eliminates the necessity for physical proximity of the output or reject pump, the compressor pump and any electric motor or motors mechanically coupled to each or both of these pumps.

From the foregoing, it will be seen that this invention is well adapted to obtain all of the ends and objects hereinabove set forth, together with other advantages which are obvious and which are inherent to the system.

Thus, the liquid purification system of the present invention not only provides a convenient system for obtaining liquid of a desired degree of purification, but also provides a system using a sequence of pressures and/or solutions which has the advantages of reducing or eliminating membrane boundary problems by an osmotic "back flush" and a system which produces "osmotic shock" to kill organisms present in the untreated liquid or at least inhibit the growth of such organisms. The system also has the ability to tolerate suspended solids in the permeator reject stream without corrosion or clogging. Due to the improved stability of the permeator operation, the simplicity of the system and the low maintenance required for the system, it is readily adaptable to completely automated operation for regulation of liquid flow.

The present invention has primary application for the purification of water from natural sources, such as industrial water, waste streams and particularly seawater. It will be understood, however, that the system of the present invention also has application to the concentration of aqueous process streams, the separation of solute species in aqueous solution and hydrocarbon separations from non-aqueous solutions.

Back pressure control valves, i.e., valves opening at a particular pressure, can be employed in place of the decompressor positive displacement pumps in the present invention, although decompressor pumps are preferred. The back pressure control valves would be bypassed when the permeator membrane is being subjected to osmotic "back flush."

The invention may be varied during each of the stages to obtain the benefit of a "back wash" or "back flush" more or less continuously during the operation of the system. This can particularly be accomplished when the input material has a high salt content.

An alternative method of obtaining the desired "back wash" or "back flush" involves the periodic addition of a substance, such as magnesium sulphate, which is highly soluble in water and is not readily permeable through the membranes used in the permeator. By regulating the pressure at the same time the magnesium sulphate is added to the input stream the osmotic pressure in the permeator can be modified to obtain the desired result. Thus, it is possible to use intermediate procedures which will prevent the build up of any substantial layer of material on the membranes in the permeator.

As many possible embodiments may be made of the invention without departing from the scope thereof, it is to be understood that all matters herein set forth or shown in the accompanying drawings are to be interpreted as illustrative and not in the limiting sense.

What is claimed is:

1. A reverse osmosis fluid treatment apparatus comprising in combination:
    a membrane which separates relatively pure fluid from untreated fluid input material;
    means for supplying untreated fluid input material to the membrane under pressure;
    means for removing reject fluid material under pressure from the membrane at a predetermined rate;
    means for storing the relatively pure fluid obtained from the membrane in a first storage container; and
    means for discontinuing the supply of untreated fluid input material to the membrane and simultaneously passing the relatively pure fluid from the first storage container through the membrane for further purification of the liquid.

2. The reverse osmosis fluid treatment apparatus of claim 1 in which the reject ratio initially employed for the fluid input material is greater than 50 percent.

3. The reverse osmosis fluid treatment apparatus of claim 2 in which the reject ratio initially employed is greater than 80 percent.

4. The reverse osmosis fluid treatment apparatus of claim 2 in which the reject ratio for the relatively pure fluid is less than 50 percent.

5. Reverse osmosis fluid treatment apparatus of claim 1 which further contains means for supplying untreated fluid input material to the membrane under pressure at a reject ratio which is higher than the reject ratio employed when supplying relatively pure fluid to the same membrane.

6. A fluid treatment process comprising the steps of:
    (a) transmitting untreated fluid through membrane apparatus by means of at least one high pressure pump and at least one decompression pump during a first stage of the system in order to separate relatively pure fluid from the untreated fluid,
    (b) storing the relatively pure fluid obtained during the first stage of the system in a first storage container,
    (c) discontinuing the passage of untreated fluid to the membrane apparatus and employing a high pressure pump and decompression pump to recirculate the relatively pure fluid from the first storage container through the membrane apparatus in order to obtain further purification of the fluid during a second stage of the system,
    (d) storing the purified fluid obtained from the membrane apparatus during the second stage of the system in a second storage container,
    (e) employing a high pressure pump and decompression pump to recirculate the purified fluid in the second storage container through the membrane apparatus for still further purification during a third stage of the system,
    (f) storing the purified fluid obtained from the membrane apparatus during the third stage of the system in a third storage container and the reject fluid obtained from the membrane apparatus during this same stage in the first storage container,
    (g) subjecting the fluid in the first storage container to utilization or further purification,
    (h) transmitting untreated fluid once again through the membrane apparatus using the high pressure pump and permitting the reject fluid from the membrane apparatus to flow directly into a drain during a fourth stage of the system, and
    (i) permitting purified fluid in the third storage container to pass into the membrane apparatus during the fourth stage until a backwash of the membrane is obtained.

7. The process of claim 6 in which the membrane apparatus is a permeator.

8. The process of claim 7 in which the reject fluid from the permeator during the second stage is less than 50 percent of the total fluid transmitted to the permeator.

9. The process of claim 6 in which reject fluid from the permeator during the first stage is greater than 80 percent of the total untreated fluid transmitted to the permeator.

10. The process of claim 9 in which two subsystems are employed during the first stage to pass untreated fluid through the permeator, each subsystem comprising a high pressure pump, a decompressor pump and a motor.

11. The process of claim 6 in which the entire sequence of steps is repeated following the completion of the fourth stage.

References Cited

UNITED STATES PATENTS

| | | | |
|---|---|---|---|
| 1,825,631 | 9/1931 | Horvath | 210—23 |
| 3,355,382 | 11/1967 | Huntington | 210—321 X |
| 3,505,216 | 4/1970 | Kryzer | 210—257 X |

FRANK A. SPEAR, Jr., Primary Examiner

U.S. Cl. X.R.

210—196, 257, 321, 433